(12) United States Patent
Riegel et al.

(10) Patent No.: US 9,651,737 B2
(45) Date of Patent: May 16, 2017

(54) OPTICAL COMMUNICATION SYSTEM HAVING FILTER WITH INDEX SELECTABLE MATERIAL AND RELATED METHODS

(71) Applicant: HARRIS CORPORATION, Melbourne, FL (US)

(72) Inventors: Nicholas Riegel, West Melbourne, FL (US); Richard T. Ammon, II, Melbourne, FL (US); Michael R. Lange, Melbourne, FL (US)

(73) Assignee: HARRIS CORPORATION, Melbourne, FL (US)

( * ) Notice: Subject to any disclaimer, the term of this patent is extended or adjusted under 35 U.S.C. 154(b) by 0 days.

(21) Appl. No.: 14/864,054

(22) Filed: Sep. 24, 2015

(65) Prior Publication Data
US 2017/0090117 A1 Mar. 30, 2017

(51) Int. Cl.
G02B 6/26 (2006.01)
G02B 6/42 (2006.01)
G02B 6/14 (2006.01)
G02B 6/28 (2006.01)
G02F 1/01 (2006.01)

(52) U.S. Cl.
CPC ............ G02B 6/14 (2013.01); G02B 6/2804 (2013.01); G02F 1/0147 (2013.01)

(58) Field of Classification Search
None
See application file for complete search history.

(56) References Cited

U.S. PATENT DOCUMENTS

| 4,142,877 A * | 3/1979 | Auracher | G02B 6/2804 |
| | | | 156/219 |
| 5,020,884 A | 6/1991 | Murphy | |
| 5,299,275 A | 3/1994 | Jackson et al. | |
| 5,586,205 A * | 12/1996 | Chen | G02B 6/2726 |
| | | | 349/1 |
| 6,011,881 A | 1/2000 | Moslehi et al. | |
| 6,280,099 B1 | 8/2001 | Wu | |
| 6,559,943 B1 | 5/2003 | Hall et al. | |
| 6,621,952 B1 * | 9/2003 | Pi | G02B 6/12007 |
| | | | 385/140 |
| 7,110,646 B2 | 9/2006 | Eggleton et al. | |
| 7,177,503 B1 | 2/2007 | Dimmick et al. | |
| 7,457,495 B2 | 11/2008 | Dimmick et al. | |
| 8,837,892 B2 | 9/2014 | Bennett et al. | |
| 8,873,897 B2 | 10/2014 | Lee | |
| 8,897,607 B2 | 11/2014 | DeSalvo et al. | |
| 2016/0223744 A1* | 8/2016 | Hoo | H01S 3/1003 |
| | | | 385/37 |

* cited by examiner

*Primary Examiner* — Chad Smith
(74) *Attorney, Agent, or Firm* — Allen, Dyer, Doppelt, Milbrath & Gilchrist, P.A.

(57) ABSTRACT

An optical filter device may include an optical fiber having a core and a cladding surrounding the core, the optical fiber having a tapered portion. The optical filter device may include an index selectable material surrounding the tapered portion and having an index of refraction being selectable based upon a physical characteristic. The optical filter device may include a device configured to change the index selectable material to select the index of refraction to selectively filter out a mode within the optical fiber.

23 Claims, 3 Drawing Sheets

OPTICAL COMMUNICATION SYSTEM HAVING FILTER WITH INDEX SELECTABLE MATERIAL AND RELATED METHODS

TECHNICAL FIELD

The present invention relates to the field of communications, and, more particularly, to optical communications devices and related methods.

BACKGROUND

In optical communication systems, information is carried along a distance using light. In some applications, the light travels over a free space. In these free space applications, a highly collimated light source, such as a laser, is used. In other applications, the light is carried by an optical fiber. The optical fiber comprises a flexible, transparent fiber made of silica.

In some applications, the optical fiber may comprise a single-mode fiber, where the optical fiber carries light only directly down the fiber, i.e. the transverse mode. In other applications, the optical signal may comprise multiple modes, i.e. being carried by a multi-mode optical fiber. Although traditional multi-mode fibers do not provide greater bandwidth than single-mode fibers, as they are limited by modal dispersion, they are used because of mode path redundancy, and therefore tolerance to connector and interface imperfections.

In some optical applications, it may be desirable to manipulate individual modes of the multi-mode optical signal, i.e. a few mode optical signal. In these few mode applications, there is an approach to the dispersion limit issue of multi-mode applications, as each mode is multiplexed as a separate data stream. The primary advantage provided by few mode signal transmission is overall signal bandwidth of the fiber, as each mode acts as an independent signal carrying path in parallel with the other mode paths. For example, in the multi-mode optical fiber, an application may need the multiple modes of the optical signal carried thereon to be separated out for processing. In these applications, the optical signal is typically split into multiple paths, each path comprising a mode filter for passing a respective mode. This application may be helpful in mitigating bandwidth bottleneck issues, by breaking the high bandwidth signal apart.

One example of an optical filter is disclosed in U.S. Pat. No. 7,110,646 to Eggleton et al. This optical filter comprises a length of fiber having a core with a certain refractive index, a cladding peripherally surrounding the core with a refractive index less than the refractive index of the core, and at least one hollow region disposed within the cladding in proximity to the core or within the core itself. The optical filter includes a liquid controllably moved within the hollow region for modifying the effective index of the fiber to tune its characteristics.

SUMMARY

Generally speaking, an optical filter device may include an optical fiber comprising a core and a cladding surrounding the core. The optical fiber may have a tapered portion. The optical filter device may include an index selectable material surrounding the tapered portion and having an index of refraction being selectable based upon a physical characteristic thereof. The optical filter device may include a device (e.g. electric heating device) configured to change the index selectable material to select the index of refraction to selectively filter out at least one mode within the optical fiber. Advantageously, the optical filter device may readily remove the at least one mode with little loss to the remaining modes.

In some embodiments, the index selectable material may comprise an index matching fluid. In one embodiment, the index of refraction may be selectable based upon a temperature thereof, and the device may comprise a heating device configured to heat the index selectable material. The index selectable material may strip out the at least one mode at room temperature and pass the at least one mode at a temperature different than room temperature. More specifically, the cladding may be continuous.

Also, the at least one mode may comprise at least one mode propagating in the core and extending to an outer edge in the cladding of the tapered portion. The cladding of the tapered portion may be axially symmetric with the core. The optical filter device may also include a container carrying the index selectable material and positioned adjacent the heating device. For example, the tapered portion of the optical fiber may have a diameter in the range of 40-55 micrometers. In other non few mode embodiments, the diameter may have a different ranges.

Another aspect is directed to an optical system. The optical system may include an optical splitter configured to receive a multi-mode optical signal, and a plurality of optical filter devices coupled downstream from the optical splitter. Each optical filter device may include an optical fiber comprising a core and a cladding surrounding the core, the optical fiber having a tapered portion, and an index selectable material surrounding the tapered portion and having an index of refraction being selectable based upon a temperature thereof. Each optical filter device may comprise a heating device configured to heat the index selectable material to select the index of refraction to selectively filter out at least one mode within the optical fiber.

Another aspect is directed to a method for operating an optical filter device. The optical filter device may comprise an optical fiber comprising a core and a cladding surrounding the core, the optical fiber having a tapered portion, and an index selectable material surrounding the tapered portion and having an index of refraction being selectable based upon a physical characteristic thereof. The method may include changing the physical characteristic of the index selectable material to select the index of refraction to selectively filter out at least one mode within the optical fiber.

DETAILED DESCRIPTION

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout.

Figure 1:
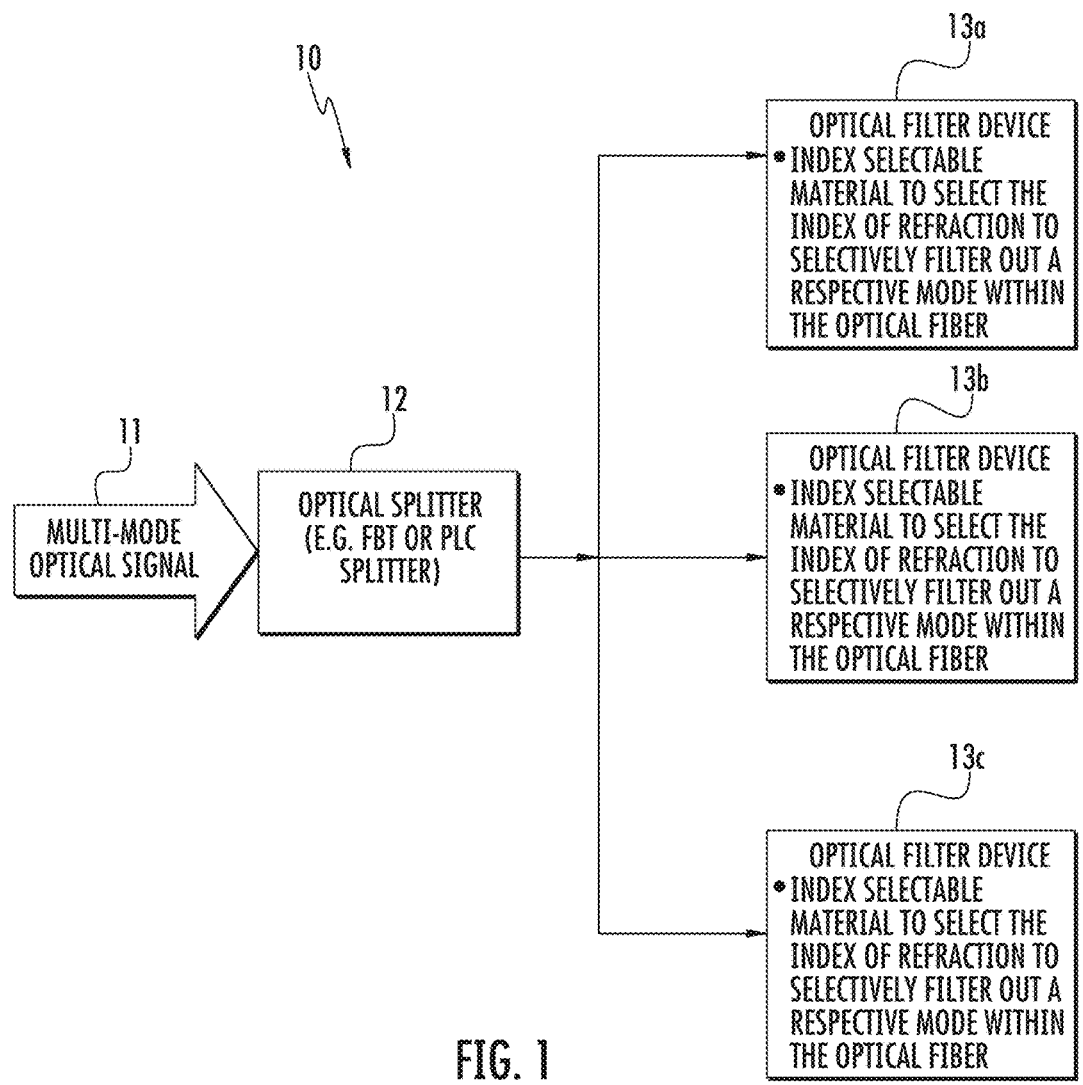
FIG. 1 is a schematic diagram of an optical system, according to the present disclosure.
Figure 2:
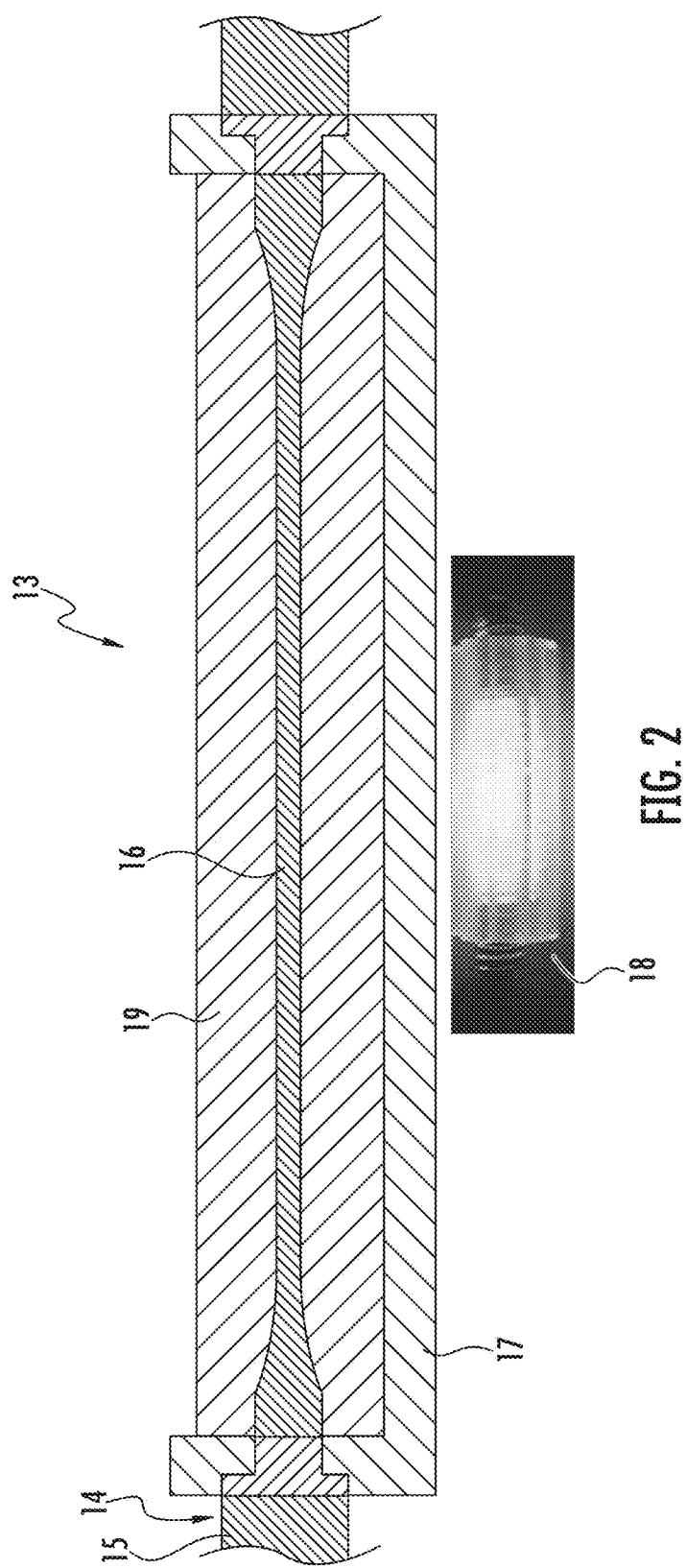
FIG. 2 is a schematic diagram of an optical filter device from the optical system of FIG. 1.
Figure 3:
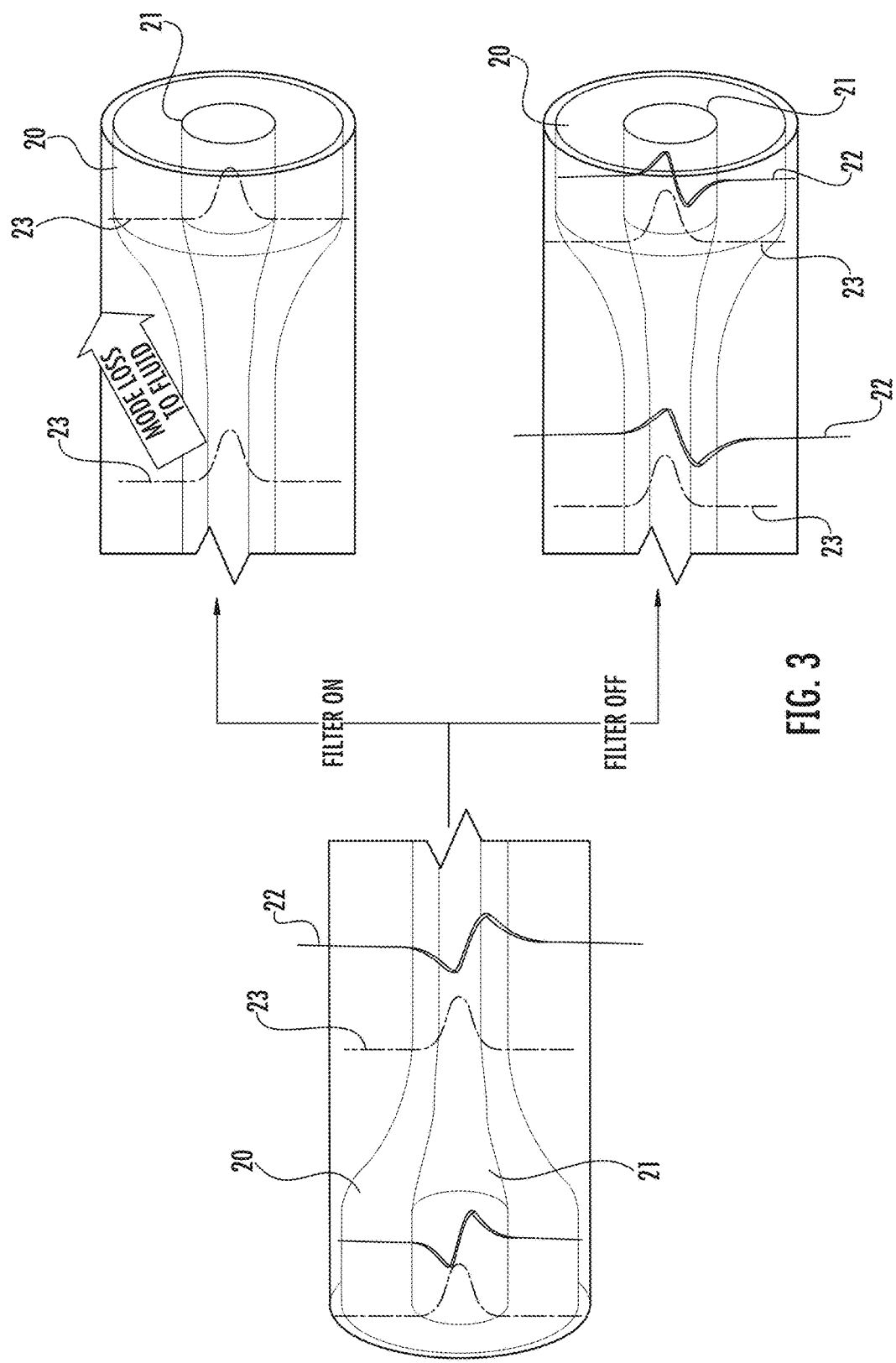
FIG. 3 is a diagram illustrating operation of the optical filter device from the optical system of FIG. 1.

Referring to FIGS. 1-3, an optical system 10 according to the present disclosure is now described. The optical system 10 illustratively includes an optical splitter 12 configured to receive a multi-mode optical signal 11 (e.g. a few mode signal). As will be appreciated, few mode fiber splitters are specialized splitters, as they need to preserve modal content. In one embodiment, a free space splitter is used and contains three collimators and a beam splitter. Other embodiments may use a Fused Biconical Taper (FBT) splitter.

The illustrated optical splitter 12 comprises a 1:3 port splitter, but other embodiments may include different splitting ratios. The optical system 10 illustratively includes a plurality of waveguide paths coupled to outputs of the optical splitter 12. Each waveguide path comprises an optical filter device 13a-13b coupled downstream from the optical splitter 12. Although not shown, each waveguide path would include other optical components downstream from the optical filter device 13a-13b, such as an electo-optic conversion device, amplifier, etc.

As perhaps best seen in FIG. 2, each optical filter device 13a-13c illustratively includes an optical fiber 14 suspended on each end and passing through a region surrounded by an index selectable material 19. The optical fiber 14 illustratively includes a core 21, a cladding 20 surrounding the core, and a coating 15 around the cladding. The optical fiber 14 illustratively includes a tapered portion 16. The optical fiber 14 may be tapered by heating (e.g. via Hydrogen flame) the optical fiber and mechanically stretching the optical fiber at opposing ends. As will be appreciated, the multi-mode optical signal 11 comprises a plurality of lower order modes 23 and a plurality of higher order modes 22. Within the tapered portion 16 of the optical fiber 14, the plurality of lower ordered modes 23 propagates through the core 21, and the plurality of higher order modes 22 propagates through the cladding 20.

Also, the cladding 20 may be continuous (i.e. solid or without any cavities, recesses, or capillaries). In some embodiments, the cladding 20 of the tapered portion 16 may be axially symmetric with the core 21. For example, the tapered portion 16 of the optical fiber 14 may have a diameter in the range of 40-55 micrometers. Also, the tapered portion 16 is tapered via a slowly varying taper. The tapered portion 16 may have a tapering rate in a range from 15 μm diameter/mm fiber (start of the taper) to 1 μm diameter/mm fiber (end of the taper). Other rates are possible in other embodiments.

Each optical filter device 13a-13c illustratively includes an index selectable material 19 surrounding the tapered portion 16 and having an index of refraction being selectable based upon a physical characteristic (e.g. temperature, electrical, mechanical, optical, chemical, or magnetic effects) of the index selectable material. In some embodiments (including the illustrated embodiment), the index of refraction is a function of temperature. In some embodiments, the index selectable material 19 may comprise an index matching fluid.

For example, in the illustrated temperature embodiments, the index of refraction of the index selectable material 19 is inversely proportional to the temperature. In another embodiment, the index of refraction of the index selectable material 19 is directly proportional to the temperature.

Each optical filter device 13a-13c illustratively includes a device (e.g. the illustrated electric conductive heating device) 18 configured to change (e.g. the illustrated heating of) the physical characteristic of the index selectable material 19 to select the index of refraction to selectively filter out at least one mode (i.e. at least one higher order mode traveling in the cladding 20) 22 within the optical fiber 14. Additionally, the optical filter device 13a-13c illustratively includes a container 17 carrying the index selectable material 19 and positioned adjacent the heating device 18.

In particular, as shown in the upper right portion of FIG. 3, the index selectable material 19 may strip out the at least one mode 22 at room temperature since the index of refraction of the index selectable material 19 would be greater than the index of refraction of the cladding 20. In other words, the at least one mode 22 would refract at the interface between the index selectable material 19 and the cladding 20 (i.e. the at least one mode would escape through the index selectable material). Also, since the plurality of higher order modes 22 propagate through cladding 20, the at least one mode would be a higher order mode.

Alternatively, as shown in the lower right portion of FIG. 3, when the index selectable material 19 is heated/cooled at a temperature different than room temperature and/or a threshold temperature, the index of refraction of the index selectable material would be reduced to be less than the index of refraction of the cladding 20 (i.e. the optical filter device 13a-13c is switchable). In this operation condition, the index selectable material 19 would pass the at least one mode 22. In other words, the at least one mode 22 would be totally internally reflected at the interface between the index selectable material 19 and the cladding 20 (i.e. continuing to propagate down the optical fiber 14).

Another aspect is directed to a method for operating an optical filter device 13a-13c. The optical filter device 13a-13c may comprise an optical fiber 14 comprising a core 21 and a cladding 20 surrounding the core, the optical fiber having a tapered portion 16, and an index selectable material 19 surrounding the tapered portion and having an index of refraction being selectable based upon a physical characteristic (e.g. temperature) thereof. The method may include changing (e.g. heating) the physical characteristic (e.g. temperature) of the index selectable material 19 to select the index of refraction to selectively filter out at least one mode 22 within the optical fiber 14.

In typical optical filter devices, there may be a desire for switchable polarization independent mode filters. In some approaches to an optical filter device, the modes of the optical signal all propagate in the cladding, which makes it sensitive to environmental interference. Other approaches are polarization sensitive; this has the consequence of decoupling the linear polarized modes (i.e. $LP_{11}$) into two vectoral modes, which can lead to imperfect mode extinction. In some tapered optical fiber approaches, the optical filter device is not switchable, making it less suited for demultiplexing spatial division multiplexing (SDM) applications (i.e. breaking a multi-mode optical signal into a plurality of branches). Some approaches use curves and wraps of the optical fiber to strip off the higher modes, but these approaches incur substantial losses to the lower order modes, and are not readily switchable. Some approaches include a tapered portion in the optical fiber, but fit a silicon sleeve over the tapered portion, which always strips out the higher order modes (i.e. lack of flexibility).

Advantageously, the optical filter device 13a-13c may provide an approach to these issues. Since the tapered portion 16 is axially symmetric and has a gradual taper rate, the multi-mode optical signal 11 has an adiabatic mode transition, which may reduce losses in the plurality of lower order modes 23. Also, the axial symmetry ensures that the optical filter device 13a-13c is also polarization, as well as mode orientation independent, for non-radially symmetric modes. The optical filter device 13a-13c may readily remove the at least one mode 22 with little loss to the remaining modes 23 (i.e. lower order modes that propagate within the core 21 of the tapered portion 16). Also, the optical filter device 13a-13c is switchable (via the heating device 18) and passive (i.e. no moving parts), providing a flexible but reliable approach.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. An optical filter device comprising:
    an optical fiber comprising a core and a cladding surrounding said core, said optical fiber having a tapered portion with a tapered core and a tapered cladding surrounding said tapered core, the tapered portion having a tapering rate in a range between 15 µm diameter/(mm fiber) and 1 µm diameter/mm fiber;
    an index selectable material surrounding said tapered-portion and having an index of refraction being selectable based upon a physical characteristic thereof; and
    a device configured to change said index selectable material to select the index of refraction to selectively filter out at least one mode within said optical fiber.

2. The optical filter device of claim 1, wherein said index selectable material comprises an index matching fluid.

3. The optical filter device of claim 1, wherein the index of refraction is selectable based upon a temperature thereof; and wherein said device comprises a heating device configured to heat said index selectable material.

4. The optical filter device of claim 3, wherein said index selectable material strips out the at least one mode at a threshold temperature and passes the at least one mode at a temperature different than the threshold temperature.

5. The optical filter device of claim 1, wherein said cladding is continuous.

6. The optical filter device of claim 1, wherein the at least one mode comprises at least one mode propagating in the tapered core and extending to an outer edge in said tapered cladding of the tapered portion.

7. The optical filter device of claim 1, wherein said tapered cladding of the tapered portion is axially symmetric with said core.

8. The optical filter device of claim 1, further comprising a container carrying said index selectable material and positioned adjacent said device.

9. The optical filter device of claim 3, wherein said heating device comprises an electric heating device.

10. The optical filter device of claim 1, wherein the tapered portion of said optical fiber has a diameter in the range of 40-55 micrometers.

11. An optical system comprising:
    an optical splitter configured to receive a multi-mode optical signal; and
    a plurality of optical filter devices coupled downstream from said optical splitter, each optical filter device comprising
        an optical fiber comprising a core and a cladding surrounding said core, said optical fiber having a tapered portion with a tapered core and a tapered cladding surrounding said tapered core, the tapered portion having a tapering rate in a range between 15 µm diameter/(mm fiber) and 1 µm diameter/mm fiber,
        an index selectable material surrounding said tapered portion and having an index of refraction being selectable based upon a temperature thereof, and
        a heating device configured to heat said index selectable material to select the index of refraction to selectively filter out at least one mode within said optical fiber.

12. The optical system of claim 11, wherein said index selectable material comprises an index matching fluid.

13. The optical system of claim 11, wherein said index selectable material strips out the at least one mode at a threshold temperature and passes the at least one mode at a temperature different than the threshold temperature.

14. The optical system of claim 11, wherein said cladding is continuous.

15. The optical system of claim 11, wherein the at least one mode comprises at least one mode propagating in the tapered core and extending to an outer edge in said tapered cladding of the tapered portion.

16. The optical system of claim 11, wherein said tapered cladding of the tapered portion is axially symmetric with said core.

17. A method for operating an optical filter device comprising an optical fiber comprising a core and a cladding surrounding the core, the optical fiber having a tapered portion with a tapered core and a tapered cladding surrounding said tapered core, the tapered portion having a tapering rate in a range between 15 µm diameter/(mm fiber) and 1 µm diameter/(mm fiber), and an index selectable material surrounding the tapered portion and having an index of refraction being selectable based upon a physical characteristic thereof, the method comprising:
    changing the physical characteristic of the index selectable material to select the index of refraction to selectively filter out at least one mode within the optical fiber.

18. The method of claim 17,
    wherein the index selectable material comprises an index matching fluid.

19. The method of claim 17,
    wherein the index of refraction is selectable based upon a temperature thereof; and wherein changing the physical characteristic of the index selectable material comprises heating the index selectable material.

20. The method of claim 19,
    further comprising stripping with the index selectable material out the at least one mode at a threshold temperature and passing the at least one mode at a temperature different than the threshold temperature.

21. The method of claim 17, wherein the cladding is continuous.

22. The method of claim 17, further comprising propagating the at least one mode in the tapered core and extending to an outer edge in the tapered cladding of the tapered portion.

23. The method of claim 17, wherein the tapered cladding of the tapered portion is axially symmetric with the core.

* * * * *